(12) United States Patent
Madden et al.

(10) Patent No.: US 6,249,285 B1
(45) Date of Patent: Jun. 19, 2001

(54) COMPUTER ASSISTED MARK-UP AND PARAMETERIZATION FOR SCENE ANALYSIS

(75) Inventors: Paul B. Madden, Acton; Jean-Pierre Schott, Weston; David Askey, Carlisle; Joseph Henry, Westford, all of MA (US); Jeffrey D. Kurtze, Hudson, NH (US); Mary Cacciatore, Westford; John S. Robotham, Belmont, both of MA (US); Curt A. Rawley, Windham, NH (US)

(73) Assignee: SynaPix, Inc., Lowell, MA (US)

( * ) Notice: Subject to any disclaimer, the term of this patent is extended or adjusted under 35 U.S.C. 154(b) by 0 days.

(21) Appl. No.: 09/056,022

(22) Filed: Apr. 6, 1998

(51) Int. Cl.[7] .................................................. G06T 17/00

(52) U.S. Cl. .............................................................. 345/419

(58) Field of Search ................................... 345/418, 419, 345/420, 423, 424, 425

(56) References Cited

U.S. PATENT DOCUMENTS

| | | |
|---|---|---|
| 3,947,833 | 3/1976 | Eckstein, Jr. ..................... 340/258 R |
| 3,970,841 | 7/1976 | Green .................................. 250/201 |
| 4,175,860 | 11/1979 | Bacus .................................... 356/39 |
| 4,385,322 | 5/1983 | Hubach et al. ....................... 358/221 |
| 4,620,318 | 10/1986 | Hill ......................................... 382/2 |
| 4,639,768 | 1/1987 | Ueno et al. ............................ 358/22 |

(List continued on next page.)

FOREIGN PATENT DOCUMENTS

| | | |
|---|---|---|
| 93/21636 | 10/1993 | (WO) . |
| 96/31979 | 10/1996 | (WO) . |
| 98/45816 | 10/1998 | (WO) . |

OTHER PUBLICATIONS

Poelman, C.J., "The Paraperspective and Projective Factorization Methods for Recovering Shape and Motion," *Carnegie Mellon School of Computer Science*, (Jul. 1995).

Becker, S., et al., "Semiautomatic 3–D Model Extraction From Uncalibrated 2–D Camera Views," *MIT Media Laboratory*.

Sawhney, H.S., "3D Geometry From Planar Parallax," *Machine Vision Group—IBM Almaden Research Center*, (1994).

Ballard, D.H., et al., "An Approach to Knowledge–Directed Image Analysis," *Computer Vision Systems*, (1978).

Burt, P.J. et al., "The Laplacian Pyramid as a Compact Image Code," *IEEE Transactions on Communications*, COM–31(4):532–540, (Apr. 1983).

Williams, T.W. et al., "Model–Building in The Visions System," *Massachusetts Institute of Technology 5th International Joint Conference on Artificial Intelligence*, 2:644–645, (Aug. 1977).

Jancene, P. et al., "RES: Computing the Interactions Between Real and Virtual Objects in Video Sequences.".

(List continued on next page.)

*Primary Examiner*—Cliff N. Vo
(74) *Attorney, Agent, or Firm*—Hamilton, Brook, Smith & Reynolds, P.C.

(57) ABSTRACT

A technique for displaying a visual representation of an estimated three-dimensional scene structure and the values of various parameters associated with the scene, together with a visual representation of at least one two-dimensional image used in the scene structure estimation algorithm. A user inputs information by adjusting parameters and/or specifying an element or region of the visual representations and supplies mark-ups and other information such as attributes for the element or region to be applied during a next iteration of the scene structure estimation algorithm. The scene structure estimation algorithm is then re-executed and the process repeats until the user is satisfied with the resulting visual scene structure.

49 Claims, 12 Drawing Sheets

U.S. PATENT DOCUMENTS

| | | | |
|---|---|---|---|
| 4,646,229 | 2/1987 | Boyle | 364/200 |
| 4,661,986 | 4/1987 | Adelson | 382/41 |
| 4,667,221 | 5/1987 | Cawley et al. | 358/22 |
| 4,682,300 | 7/1987 | Seto et al. | 364/571 |
| 4,685,146 | 8/1987 | Fenster et al. | 382/54 |
| 4,692,806 | 9/1987 | Anderson et al. | 358/209 |
| 4,703,514 | 10/1987 | van der Wal | 382/41 |
| 4,706,296 | 11/1987 | Pedotti et al. | 382/42 |
| 4,835,532 | 5/1989 | Fant | 340/728 |
| 4,847,688 | 7/1989 | Nishimura et al. | 358/125 |
| 4,849,746 | 7/1989 | Dubner | 340/728 |
| 4,858,000 | 8/1989 | Lu | 358/84 |
| 4,864,394 | 9/1989 | Gillard | 358/105 |
| 4,870,692 | 9/1989 | Zuiderveld et al. | 382/6 |
| 5,058,042 | 10/1991 | Hanna et al. | 364/522 |
| 5,063,603 | 11/1991 | Burt | 382/37 |
| 5,067,014 | 11/1991 | Bergen et al. | 358/105 |
| 5,133,070 | 7/1992 | Barker et al. | 395/650 |
| 5,134,473 | 7/1992 | Nagura | 358/109 |
| 5,140,416 | 8/1992 | Tinkler | 358/88 |
| 5,210,799 | 5/1993 | Rao | 382/22 |
| 5,212,544 | 5/1993 | Kellar et al. | 358/22 |
| 5,259,040 | 11/1993 | Hanna | 382/41 |
| 5,260,791 | 11/1993 | Lubin | 358/160 |
| 5,270,756 | 12/1993 | Busenburg | 358/109 |
| 5,296,926 | 3/1994 | Nagura | 348/144 |
| 5,325,449 | 6/1994 | Burt et al. | 382/56 |
| 5,355,450 | 10/1994 | Garmon et al. | 395/162 |
| 5,414,806 | 5/1995 | Richards | 395/135 |
| 5,455,775 | 10/1995 | Huber et al. | 364/488 |
| 5,473,364 | 12/1995 | Burt | 348/47 |
| 5,488,674 | 1/1996 | Burt et al. | 382/284 |
| 5,511,153 | 4/1996 | Azarbayejani et al. | 395/119 |
| 5,577,190 | 11/1996 | Peters | 395/501 |
| 5,588,104 | 12/1996 | Lanier et al. | 395/326 |
| 5,588,139 | 12/1996 | Lanier et al. | 395/500 |
| 5,596,687 | 1/1997 | Peters, Jr. | 395/130 |
| 5,619,628 * | 4/1997 | Fujita et al. | 345/427 |

OTHER PUBLICATIONS

Rohrer, R., "Automated Construction of Virtual Worlds Using Modeling Constraints," *The George Washington University—Progress Report*, (Jan. 1994).

Debevec, P.E., et al. "Modeling and Rendering Architecture from Photographs: A Hybrid Geometry–and Image–Based Approach," *Computer Graphics Proceedings, Annual Conference Series*, 11–20, (1996).

Debevec, P.E., et al. "Recovering High Dynamic Range Radiance Maps from Photographs," *Computer Graphics Proceedings, Annual Conference Series*, 369–378, (1997).

Alzarbayejani, A., et al. "Recursive Estimation of Motion, Structure, and Focal Length," *IEEE Transactions on Pattern Analysis and Machine Intelligence*, 17(6):562–575, (Jun. 1995).

Berthold, K.P.H., et al. "Determining Optical Flow," *Artificial Intelligence*, 17:185–203, (1981).

Brooks, R.A., et al. "Geometric Modeling in Vision for Manufacturing," *SPIE*, 281:141–159, (1981).

Fua, P., "Model–Based Optimization: An Approach to Fast, Accurate, and Consistent Site Modeling from Imagery," *Artificial Intelligence Center—SRI International*.

Fua, P., et al. "Using 3–Dimensional Meshes to Combine Image–Based and Geometry–Based Constraints," *SRI International*.

Tomasi, C., et al., "Shape and Motion from Image Streams: a Factorization Method—Planar Motion," *Carnegie Mellon School of Computer Science*, (Sep. 1990).

Tomasi, C., et al., "Shape and Motion from Image Streams: a Factorization Method—Point Features in 3D Motion," *Carnegie Mellon School of Computer Science*, (Jan. 1991).

Tomasi, C., "Shape and Motion from Image Streams: a Factorization Method," *Carnegie Mellon School of Computer Science*, (Sep. 1991).

Little, T.D.C., et al., "Interval–Based Conceptual Models for Time–Dependent Multimedia Data," *Boston University Multimedia Communications Laboratory and Purdue University School of Electrical Engineering Multimedia Communications Lab*, (May 1993).

Schechter, G., et al., "Functional 3D Graphics in C++—with an Object–Oriented, Multiple Dispatching Implementation," *Eurographics Object–Oriented Graphics Workshop*, (1994).

Elliott, C., "The Essence of ActiveX Animation," *Microsoft Research*, (Feb. 1997).

Elliott, C., "A Brief Introduction to Active VRML," *Microsoft Research Technical Report*, (Feb. 1996).

Maestri, G., "Parametric, Object–Oriented Modeling and Animation with Houdini, " pp. 48–50, *Digital Magic*, (Aug. 1997).

Drazovich, R.J., et al., "Radar Target Classification," pp. 496–501, *IEEE*, (Aug. 1981).

Levine, M.D. et al., "A Knowledge–Based Computer Vision System," pp. 335–352, *Computer Vision Systems*, (1978).

State, A. et al., "Superior Augmented Reality Registration by Integrating Landmark and Magnetic Tracking," pp. 429–438, *Computer Graphics Proceedings, Annual Conference Series*, (1996).

"Middlesex Virtual Set System," *Product Brochure*, (1997).

"Cyberset O Highland Virtual Set," *Product Orad High–Tec Systems*, (1997).

"Virtual Replay Sports Analysis Tool," *Product Brochure*, (1997).

"Jaleo Digital Post Production System," *Product Brochure*, (1997).

"Flint and Flint RT," *Product Brochure*, (Mar. 1997).

"Warner Digital Creates Glacial Gales," *American Cinematographer*, pp. 38–39, (Jul. 1997).

"Digiscore Saves the Day," *Product Flyer*, (1996).

"Inferno," http://www.discreet.com, (1997).

"Flame," *Product Description*, http://www.discreet.com, (1997).

"Composer V4," *Alias Wave Front Product Description*, (1995).

"Power Animator," *Alias/Wavefront Product Brochure*, (1996).

"SoftImage 3D 3.51 for Windows," *Product Review*, (1995).

"3D Studio Max," *Product Review*, (1997).

"Animation Master," *Product Demonstration*, (1997).

Clarkson, M., "3D Animation Tools for Less Than $1,500," *PC Graphics and Video*, pp. 52–56, (Aug. 1996).

Hamlin, J.S., "Autodessys' 3D Modeler FormZ Renderzone 2.8," *PC Graphics and Video*, pp. 58–62, (Aug. 1996).

Street, R., "3–D Software for the Newcomer," *A V Video*, pp. 62–67, (Jul. 1996).

Sowizral, H., et al., "Java 3D API Specification," (Aug. 1997).

Tenenbaum, J.M., et al., "IGS: A Paradigm for Integrating Image Segmentation and Interpretation," *Artificial Intelligence Center—Stanford Research Institute*, pp. 504–513.

Binford, T.O., et al., "Image Understanding Via Geometric Models," pp. 364–369, *IEEE*, (1980).

Price, K.E., et al., "Symbolic Matching of Images and Scene Models," pp. 105–112, *IEEE*, (1982).

Amini, A.A., et al., "Representation and Organization of Domain Knowledge in a Blackboard Architecture: A Case Study from Computer Vision," pp. 884–889, *IEEE*, (1987).

Feldman, J.A., et al., "Decision Theory and Artificial Intelligence—A Semantics–Based Region Analyzer," *Artificial Intelligence*, 5:349–371, (1974).

Barrow, H.G., et al., "Representation and Use of Knowledge in Vision," *Stanford Research Institute*.

Nevatia, R., et al., "Description and Recognition of Curved Objects," *Artificial Intelligence*, 8:77–98, (1977).

Parma, C.C., et al., "Experiments in Schema–Driven Interpretation of a Natural Scene," pp. 237–245, *IEEE* (1980).

Hanson, A.R., et al., "Constructing Semantic Models in the Visual Analysis of Scenes," *The Milwaukee Symposium on Automatic Computation and Control*, pp. 97–102.

Shaheen, S.I., et al., "Some Experiments with the Interpretation Strategy of a Modular Computer Vision System," *Pattern Recognition*, 14(1–6): 87–100, (1981).

Levine, M.D., et al., "A Modular Computer Vision System for Picture Segmentation and Interpretation," *IEEE Transactions on Pattern Analysis and Machine Intelligence*, PAMI–3(5):540–556, (Sep. 1981).

Levine, M.D., et al, "A Modular Computer Vision System for Picture Segmentation and Interpretation," pp. 522–539, *IEEE*, (1979).

"Nonlinear Video Reigns at NAB," *NewMedia*, pp. 21–29, (Jun. 1996).

Beale, S., "Media Components Come Together," www.macworld.com, pp. 56–57, (Nov. 1996).

Gagalowicz, A., "Collaboration Between Computer Graphics and Computer Vision," *Proceedings of the Third International Conference on Computer Vision*, Osaka, Japan, pp. 733–737 (Dec. 4–7, 1990).

Menon, J., "Collaborative Visualization and Modeling," *Proceedings of the 1997 International Conference on Shape Modeling and Applications*, Aizu–Wakamatsu, Japan, pp. 178–187 (Mar. 3–6, 1997).

* cited by examiner

COMPUTER ASSISTED MARK-UP AND PARAMETERIZATION FOR SCENE ANALYSIS

BACKGROUND

Techniques for automated recovery of estimated three-dimensional scene structure from multiple two-dimensional images of a visual scene, and the availability of general and special purpose computing engines to support the required calculations, are advancing to a level that makes them practical in a range of design visualization applications. By recovering the estimated scene structure, it is possible to treat the elements of a visual scene as abstract three-dimensional geometric and/or volumetric objects that can be processed, manipulated and combined with other objects within a computer-based system.

One application of these techniques is in media production—the process of creating media content for use in films, videos, broadcast television, television commercials, interactive games, CD-ROM titles, DVD titles, Internet or intranet web sites, and related or derived formats. These techniques can be applied in the pre-production, production and post-production phases of the overall media production process. Other areas include industrial design, architecture, and other design visualization applications.

In creating such design visualization content, it is common to combine various elements and images from multiple sources, and arrange them to appear to interact as if they were in the same physical or synthetic space. It is also common to re-touch or otherwise manipulate images to enhance their aesthetic, artistic or commercial value, requiring the artist to estimate and/or simulate the three-dimensional characteristics of elements in the original visual scene. The recovery of three-dimensional scene structure including camera path data greatly expands the creative possibilities, while reducing the labor-intensive burdens associated with either modeling the elements of the scene by hand or by manipulating the two-dimensional images to simulate three-dimensional interactions.

In these image-based scene analysis techniques, the computer accepts a visual image stream such as produced by a motion picture, film or video camera. The image stream is first converted into digital information in the form of pixels. The computer then operates on the pixels in certain ways by grouping them together, comparing them with stored patterns, and other more sophisticated processes which use when available information such as camera position, orientation, and focal length to determine information about the scene structure. So-called "machine vision" or "image understanding" techniques are then used to automatically extract and interpret the structure of the actual physical scene as represented by the captured images. Computerized abstract models of elements of the scene may then be created and manipulated using this information about the actual physical scene. A computer-generated generated image stream of a synthetic scene can be similarly analyzed.

For example, Becker, S. and Bove, V. M., in "Semiautomatic 3D Model Extraction from Uncalibrated 2-D Camera Views," *Proceedings SPIE Visual Data Exploration and Analysis II*, vol. 2410, pp. 447–461 (1995) describe a technique for extracting a three-dimensional (3-D) scene model from two-dimensional (2-D) pixel-based image representations as a set of 3-D mathematical abstract representations of visual objects in the scene as well as camera parameters and depth maps.

Horn, B. K. P. and Schunck, B. G., in "Determining Optical Flow," *Artificial Intelligence*, Vol. 17, pp. 185–203 (1981) describe how so-called optical flow techniques may be used to detect velocities of brightness patterns in an image stream to segment the image frames into pixel regions corresponding to particular visual objects.

Sawhney, H. S., in "3D Geometry from Planar Parallax", IEEE 1063–6919/94 (1994), pp. 929–934 discusses a technique for deriving 3-D structure through perspective projection using motion parallax defined with respect to an arbitrary dominant plane.

Poelman, C. J. et al in "A Paraperspective Factorization Method for Shape and Motion Recovery", Dec. 11, 1993, Carnegie Mellon University Report (MU-CS-93-219), elaborates on a factorization method for recovery both the shape of an object and its motion from a sequence of images, using many images and tracking many feature points.

The goal for the creator of multimedia content in using such a scene model is to create as accurate a representation of the scene as possible. For example, consider a motion picture environment where computer-generated special effects are to appear in a scene with real world objects and actors. The content creator may choose to start by creating a model from digitized motion picture film using automatic image-interpretation techniques and then proceed to combine computer-generated abstract elements with the elements derived from image-interpretation in a visually and aesthetically pleasing way.

Problems can occur with this approach, however, since automatic image-interpretation processes are statistical in nature, and the input image pixels are themselves the results of a sampling and filtering process. Consider that images are sampled from two-dimensional (2-D) projections (onto a camera's imaging plane) of three-dimensional (3-D) physical scenes. Not only does this sampling process introduce errors, but also the projection into the 2-D image plane of the camera limits the amount of 3-D information that can be recovered from these images. The 3-D characteristics of objects in the scene, 3-D movement of objects, and 3-D camera movements can typically only be partially quantified from sequences of images provided by cameras.

As a result, image-interpretation processes do not always automatically converge to the correct solution. For example, even though one might think it is relatively straight forward to derive a 3-D mathematical representation of a simple object such as a soda can from sequences of images of that soda can, a process for determining the location and size of a 3-D wire frame mesh needed to represent the soda can may not properly converge, depending upon the lighting, camera angles, and so on used in the original image capture. Because of the probabilistic nature of this type of model, the end result cannot be reliably predicted.

SUMMARY OF THE INVENTION

A key barrier to widespread adoption of these scene structure estimation techniques in the area of design visualization applications such as multimedia production has been the inherent uncertainty and inaccuracy of estimation techniques and the resulting inability to generate aesthetically acceptable imaging. The information encoded in the images about the actual elements in the visual scene and their relationships is incomplete, and typically distorted by artifacts of the automated imaging process. The utility of automated scene structure recovery drops dramatically as the estimates become unreliable and unpredictable wherever the information encoded in the images is noisy, incomplete or simply missing.

The quality and completeness of scene structure recovery can be greatly improved if a human operator provides additional information, corrects estimation errors, and controls parameters to the estimation process. This would be done most efficiently as adjustments, annotations and mark-ups on a display that includes visual representations of parametric values of the images, and of the algorithmic results. The mark-up and information provision can be done on either visual representations of the images, or on visual representations of the algorithmic results, or in fields of parameter values, or any combination of these.

The present invention is a method and apparatus for developing an estimation of the structure of a three-dimensional scene and camera path from multiple two-dimensional images of the scene. The technique involves displaying a visual representation of an estimated three-dimensional scene structure and the values of various parameters associated with the scene, together with a visual representation of at least one two-dimensional image used in the scene structure estimation algorithm. A user inputs information by adjusting parameters and/or specifying an element or region of the visual representations and supplies information such as attributes for the element or region to be applied during a next iteration of the scene structure estimation algorithm. The scene structure estimation algorithm is then re-executed and the process repeats until the user is satisfied with the resulting visual scene structure.

The information provided by the user may indicate mark-ups of different materials properties of objects in the images such as translucent areas, transparent areas, or opaque areas. User mark-up may also include indication of reflective surfaces, shadows, and specular highlights.

The user mark-up can supply fixed or relative distances in the original scene such as distances between two objects or the distance from objects to the camera. These are also referred to as "ground truth" measurements. These mark-up specifications may also directly modify depth information associated with the specified region.

The system presents these image capture parameters, enabling a user to adjust these parameters in concert with or independent of the mark-up iterations, then presents to the user a revised visual representation of scene structure and two-dimensional images for further iterations. The system therefore feedbacks to the user whether such parameter adjustments have enhanced or degraded performance. In the feedback, the system can provide automated guidance for further mark-up or parameter adjustment by the user.

The information provided by the user may also include the adjustment of parameter values used by the algorithms in analyzing the scene. Such parameters may include the focal length of the camera for a given image or in the case of a zoom a change over a sequence of images of such focal length. They may include the camera's shutter speed or the camera's motion in translation or rotation over time. They may include positional and type information regarding lighting sources active during capture; and in this case these may be directed related to the visual mark-ups dealing with specularity for instance.

In another aspect of the invention, the user may specify the location of planar surfaces in a sequence of images which are of particular importance when the structure estimation algorithm uses a planar parallax method. This marked up region can then be used in the planar fit and successive steps of this method. Mark-up of planar surfaces can also be used to directly establish relative depths.

The visual representation of the scene structure may be presented in a number of different ways. For example, it may be presented as a three-dimensional view as a wireframe mesh which indicates the relative distance of surfaces in this scene. Furthermore, a texture map of the image may be placed over the surface mesh.

In addition, a gray scale depth matte may be used where luminance of each pixel indicates a depth estimate for a corresponding region of the image and/or a similar false colored depth matte, where color of each pixel represents depth may be provided.

The invention provides increased certainty and accuracy of depth estimation techniques by providing information about the production parameters and about the actual elements in the visual scene and their relationships. Furthermore, with user directed mark-up of the depth estimate, distortion typically introduced by artifacts of automatic imaging processes may be reduced. As a result, the utility of automated scene structure recovery techniques becomes much greater as the estimates become more reliable and predictable even with images containing noisy, incomplete, or missing components.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a series of images in which mark-ups are carried through.

DETAILED DESCRIPTION OF PREFERRED EMBODIMENTS

Figure 1:
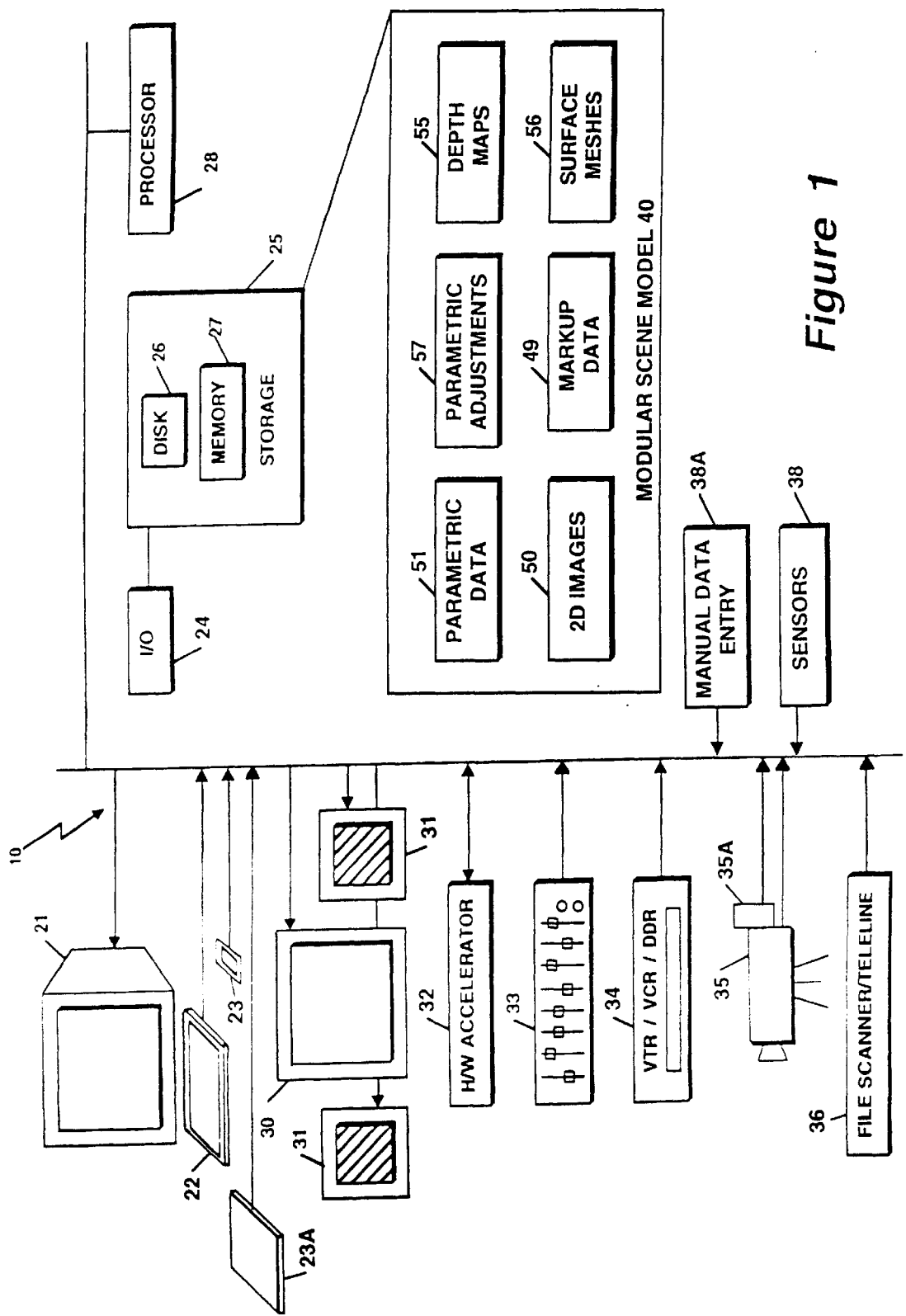
FIG. 1 is a block diagram of an image processing system which develops a scene model according to the inventions.

Turning attention now in particular to the drawings, FIG. 1 is a block diagram of the components of a digital image processing system 10 according to the invention. The system 10 includes a computer workstation 20, a computer monitor 21, and input devices such as a keyboard 22 and mouse 23 and tablet 23A. The workstation 20 also includes input/output interfaces 24, storage 25, such as a disk 26 and random access memory 27, as well as one or more processors 28. The workstation 20 may be a computer graphics workstation such as the O2/Octane sold by Silicon Graphics, Inc., a Windows NT type-work station, or other suitable computer or computers. The computer monitor 21, is keyboard 22, mouse 23, tablet 23A, and other input devices are used to interact with various software elements of the system existing in the workstation 20 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Camera parameters 35A may be included to provide data and information concerning type, position, lens, focal length and other information about the cameras 35. Sensors 38 and manual data entry 38A may also provide information about the scene and image capture devices.

The invention, in particular, is a modular scene model 40 and the processes used to develop the modular scene model 40. As shown in FIG. 1, the modular scene model 40 includes the original 2-D images 50; captured parametric data and information 51; mark-up data 49 related to the images 50; adjustments 47 to parametric data 51; depth maps 55 for the images 50; and surface meshes 56 for the images 50.

Figure 2:
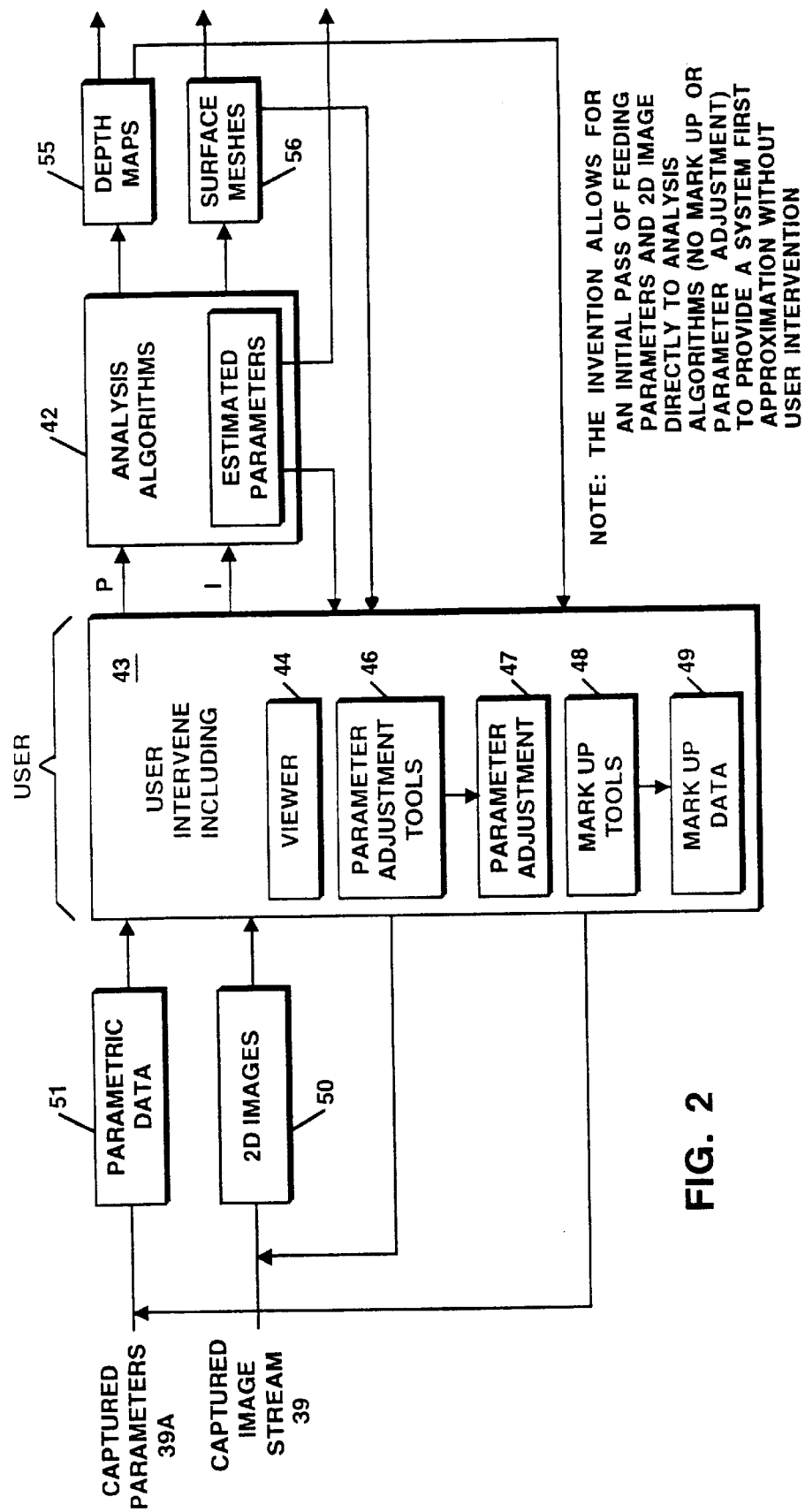
FIG. 2 is a illustration of various functional elements and data structures used in the scene model.

As shown in greater detail in FIG. 2 the modular scene model 40 is created and modified by software including an analysis function 42, parametric adjustment tools 46, and mark-up tools 48. The analysis function 42 uses image processing algorithms, such as "machine vision" or "image understanding" algorithms, sometimes in conjunction with captured parametric data 39A, to extract and interpret information about the captured images 39.

This information extracted from the physical scene, as detected and/or estimated from the captured image(s), then become the basis for generating initial depth maps 55 and/or surface meshes 56 that characterize the scene. The initial depth maps 55 and/or surface meshes 56 may contain information not only derived from the captured image sources themselves, such as VTR/VCR/DDR 34 (camera 35 and film scanner/telecine 36) but also that derived from camera data capture 35A, manual data entry 38A and other secondary sensors 38. In addition, depth maps 55 and/or surface meshes 56 may be derived from synthetic image streams provided by external computer systems such as graphics systems and other computer modeling systems.

Further refinement of the depth maps 55 and/or surface meshes 56 may be achieved in a number of different ways. In a first scenario, the results of the initial pass of the image analysis function 42 are represented as depth maps 55 and/or surface meshes 56, presenting the user of the system 10 with a rendition of the scene via the scene viewer 44 for comparison to the original 2-D images 50. The user then provides inputs through the user interface 43 to refine the depth maps 55 and/or surface meshes 56. This can be done via the mark-up tools 48 whereby the user provides information to the system identifying elements or regions in the image as being straight lines, planes, circles, and other geometric abstractions or pixel regions, such information being called mark-up data 49. The analysis function 42 is performed again utilizing this additional mark-up data 49 combined with the 2-D images 50 to produce a modified set of depth maps 55 and/or surface meshes 56 which are subsequently displayed in the viewer.

Continuing to pay attention briefly to FIG. 2, in the initial pass, analysis techniques 42 based strictly on the input image streams 39 can derive an initial modular scene model 40 containing depth maps 55 and/or surface meshes 56 that estimate the relative "depths" and positions of pixels or pixel regions in the original 2-D images. This process may typically also include estimating camera parameters 45 to provide depth estimates such as computed from image parallax between multiple images of the same scene, either successive images from the same camera or images from two or more cameras. Data from other sensors such as laser rangefinders, can also be used in depth estimation. Such estimates and additional data can be used in the analysis techniques 42 in combination with the mark-up data 49 to produce further refinements of the depth maps 55 and/or surface meshes 56.

In a second scenario the results of the initial pass of the image analysis function 42 are represented as depth maps 55 and/or surface meshes 56 and presented to the user via the scene viewer 44 as described earlier. The user then provides input in the form of parametric adjustments 47 performed within the parametric adjustment tools 46 portion of the user interface 43. Such inputs may include adjustments to the parameters such a focal length, the physical distance between two points in the scene, referred to as a "ground truth", camera position in time, camera shutter speed, and camera aperture settings for given frames of the captured image streams 39. Analysis function 42 is performed again utilizing this additional parametric information 47 combined with either original 2-D images 50, or in yet a third scenario with depth maps 55 and/or surface meshes 56 resulting from prior mark-up tools 48 usage, to produce further refined depth maps 55 and/or surface meshes 56 which are subsequently displayed in the viewer 44.

In a forth scenario, the user may elect to utilize the methods described above but with particular attention upon refining and improving camera path data as a combination of original parametric data 51 and parametric adjustments 47. In this scenario the estimated camera parameter data as part of 45 is adjusted by the user via the parametric adjustment tools 46. The analysis function 42 is performed again and the resultant depth maps 55 and/or surface meshes 56 are presented to the user through the viewer 44. Through a combination of visual inspection and quantitative system feedback the user can then iteratively adjust the camera parameter values to produce a more acceptable result.

For more information concerning the details of a preferred embodiment for the various elements of the scene model 40, please refer to our co-pending United States patent application by Madden, P. B. et al. entitled "Adaptive Modeling and Segmentation of Visual Image Streams", U.S. patent application Ser. No. 08/948,721 filed Oct. 10, 1997 now U.S. Pat. No. 6,124,864, and assigned to SynaPix, Inc., the assignee of the present application, which is hereby incorporated by reference.

Figure 3:
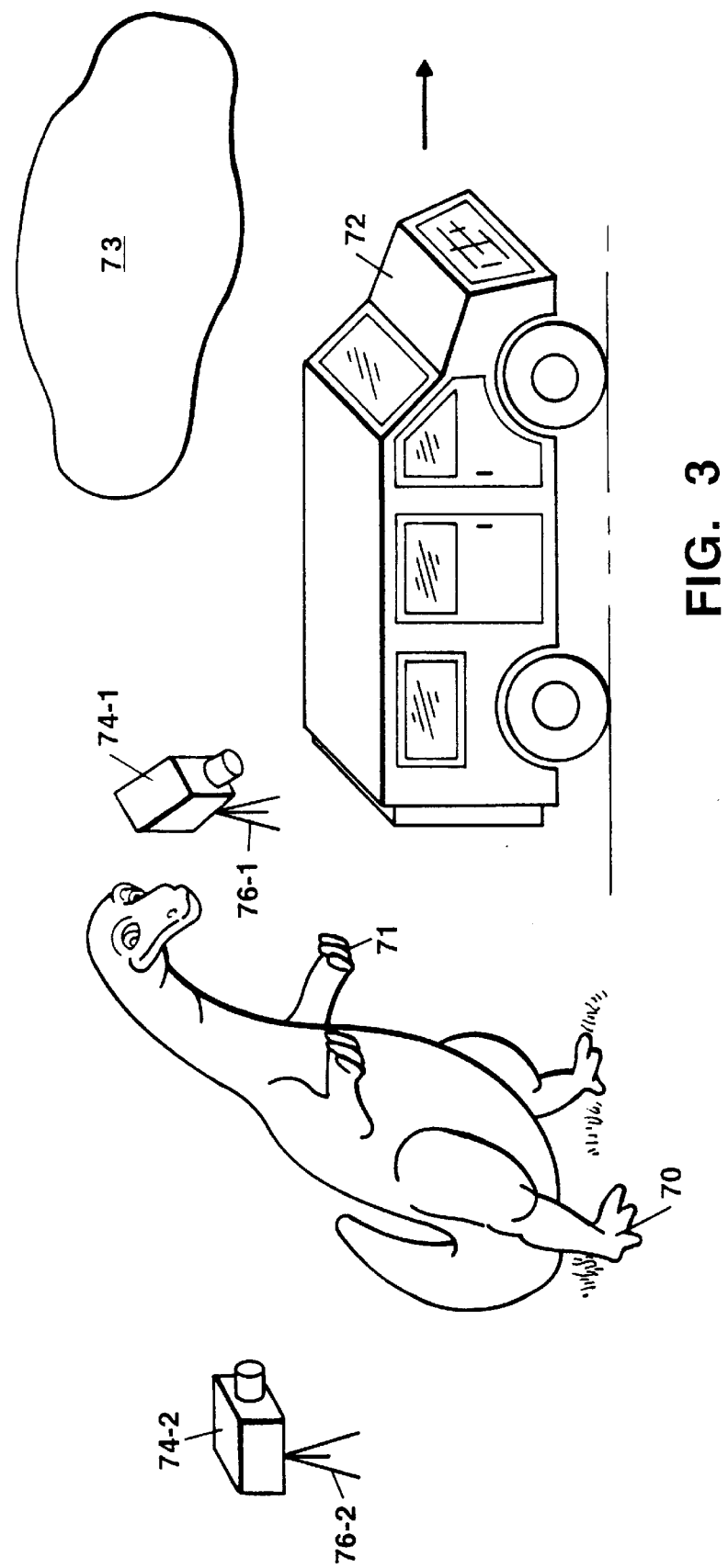
FIG. 3 is a view of the situation typically encountered by a visual effects specialist for a media production, who wishes to integrate real world images such as captured by film or video cameras together with synthetic objects, or combine multiple images of objects that were separately captured.

Turning attention now to FIG. 3, the techniques for construction of the modular scene model in accordance with the present invention may be more particularly understood. This figure illustrates the situation typically encountered by the creator of a multimedia production who wishes to integrate visual elements taken from real world scenes together with elements generated by computer animation. In the view of FIG. 3, for example, the scene is confronted by the producer of a movie such as "Jurassic Park" in which a computer generated dinosaur 70 appears to interact with a sport utility vehicle 72 moving through a jungle 73. The views of the sport utility vehicle 72 and jungle 73 are captured by motion picture cameras 74-1 and 74-2. The motion picture cameras 74-1 and 74-2 are typically and preferably mounted on corresponding moving platforms 76-1 and 76-2. The dinosaur 70 is a completely computer generated artifact and is therefore not available at the time of shooting the real world scene. Rather, the dinosaur 70 is produced using known computer animation techniques typically in a separate environment.

The producer is therefore confronted with a need to integrate real world elements shot with the film cameras 74 such as the vehicle 72 and jungle 73 with computer animated dinosaur 70 in an aesthetically pleasing way. In order to do so, the aforementioned modular scene model 40 is created using an initial image processing algorithm, including a machine vision or image understanding algorithm to extract and interpret information about particular aspects of the objects in the images, such as the structure of the vehicle 72, for example.

Figure 4A:
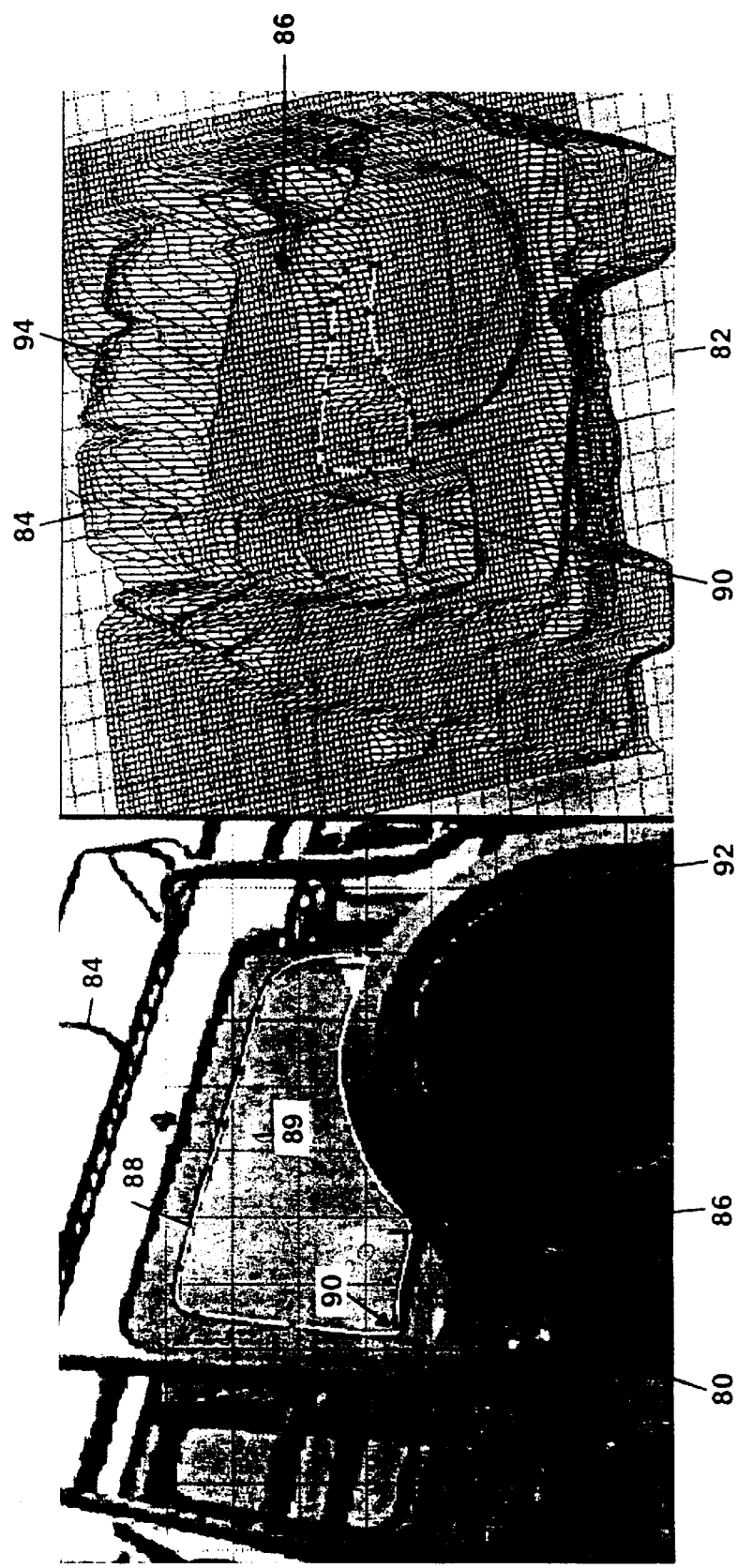
FIG. 4A is a view of the display presented by the invention to allow user mark-up.

A first pass of the output of such an algorithm is shown in FIG. 4A. This display, for example, may typically be presented to the user of the system 10 on the video monitor 30. In this embodiment of the invention, the user is presented with a visual representation of one of the two-dimensional images resulting from the image capture. Typically there are a series of images sampled and stored from one of the cameras 74-1 and 74-2.

On the right hand side of the display 30 is presented a mesh representation 92 of the estimated three-dimensional scene structure 82 as provided by the image analysis algorithm 42. For example, the information provided by the initial elements of the modular scene model 40 contains objects that estimate the relative depths and positions of pixels or pixel regions in particular with respect to the camera. From this view of the mesh 82, the user may understand particular features of the real world scene that are important to a realistic rendition of the production.

Figure 4B:
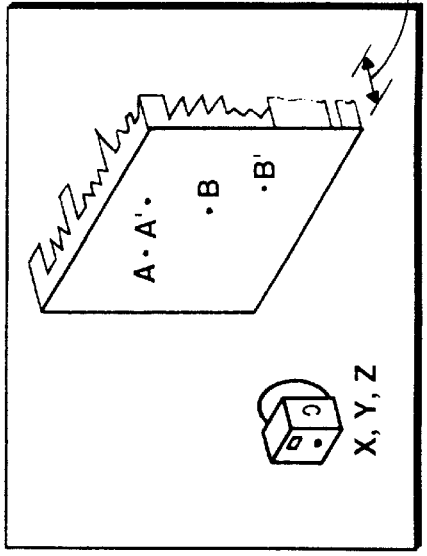
FIG. 4B is a view of the display presented by the invention to allow user adjustment of parameters.

An alternative display of the first pass output of the analysis algorithms 42 is shown in FIG. 4B. The user is presented with a visual representation of one of the 2-D images 50 resulting from the image capture stream 39. On the right side of the display 30 is presented a global perspective view of the estimated 3-D scene structure 81, the camera position 83 in a world coordinate system (X, Y, Z), at a point in time, T, as well as user identified points of interest 85 within the scene structure. From this view of the scene, the user may understand particular parameters of the real world scene that are important to an esthetically appealing rendition of the production.

Returning to FIG. 4A, the user may wish the computer animated dinosaur 70 to grab the back of the rack portion 84 of the vehicle 72 and flip the vehicle 72 over. The user can tell from the visual presentations 80 and 82 that the upper rack portion 84 is a particular distance further away from the camera than a window area 86 by comparing the portions of the mesh 82. This is ultimately of importance in obtaining the maximum perceived realism and maximum utilization of computing resources available such as, for example, to have the hand portion 71 of the computer generated dinosaur 70 grasp only the upper rack portion 84 and to not appear to interact with the back window 86.

The user then proceeds to provide a mark-up of a region of the two-dimensional visual image 50. For example, the user may provide an outline 88 of a window region 86 such as by using the input device 33 to indicate a set of points along the outer edge of the window 88. It should be understood that this point set selection technique for marking up the two-dimensional graphic object is not the only technique for the user to indicate various regions of the two-dimensional image 80. For example, rectangular, circular or elliptical lassos may be indicated as well as the fitting of curves such as Bezier curve outlines to objects, or regions of pixels can be specified using a so-called computer "painting" tool.

The user may provide additional parametric information as shown in FIG. 4B. For example, the user may identify particular or multiple points of interest 85 within the scene structure 81 and provide estimated or physically measured distances 38A between these points. The user may provide additional data regarding camera locations through time 83, or make adjustments to prior estimates. Other parameters such as focal length may likewise be adjusted to improve the subsequent performance of analysis algorithms 42 in producing an aesthetically improved result.

It should also be understood that while in the examples shown in FIGS. 4A and 4B the user is marking up a particular object such as the back window 88, or adjusting camera parameters like camera position, that the same tools can be used to determine physical dimensions in the scene, the location of objects, the masking of moving objects, shadows or reflections analysis and/or the masking of reflections and shadows during moving object segmentation. What is important is to understand the user isolates various visual elements of the scene from one or more images and provides various attributes about these elements to enable further iterations of the scene depth analysis algorithm to converge more readily to a solution which is of use to the user.

Figure 5:
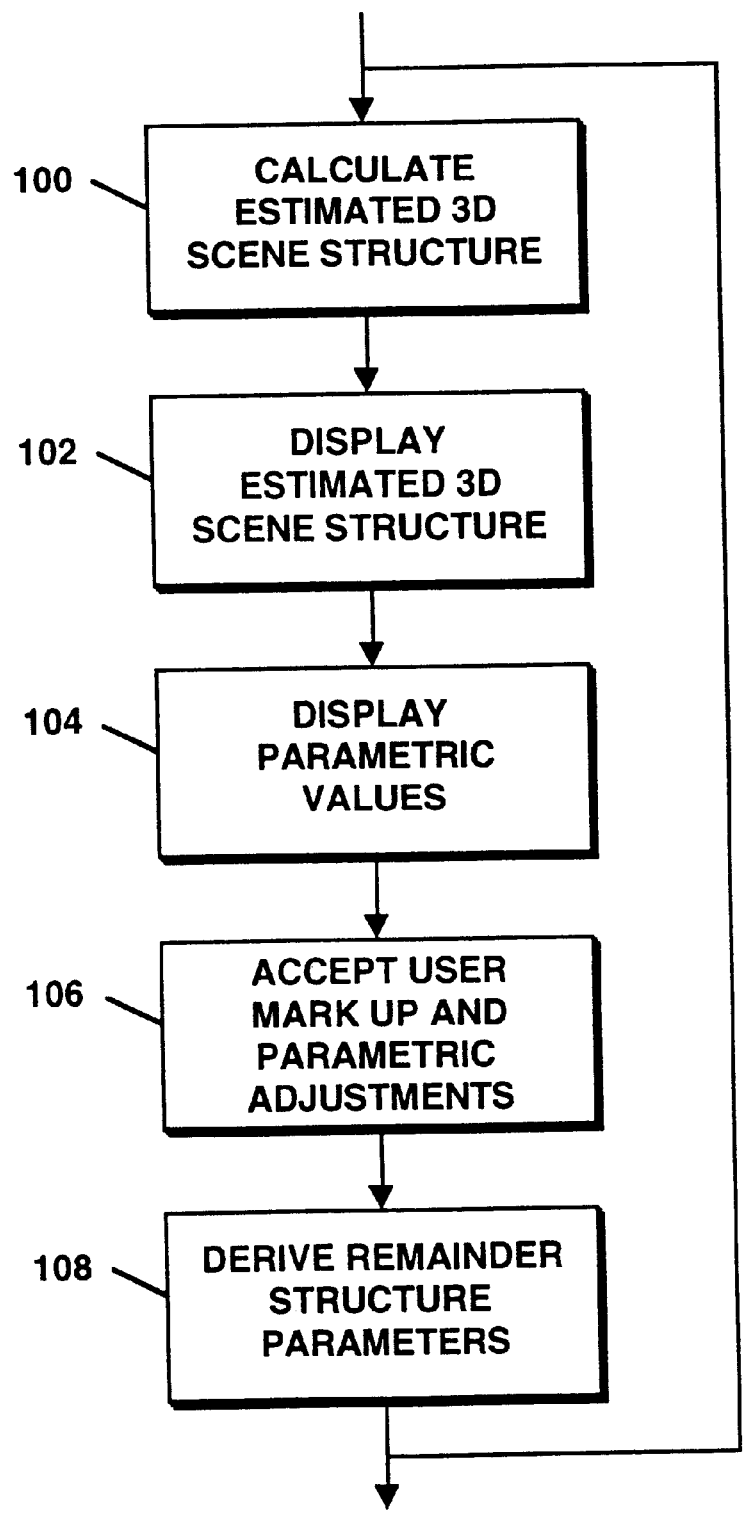
FIG. 5 is a flow chart of the operations performed by the invention to arrive at a scene structure model

As shown in FIG. 5 this process consists of a number of states. In a first state 100, the system 10 is permitted to calculate an estimated scene structure given the input sequence of images using any number of known techniques.

Figure 7:
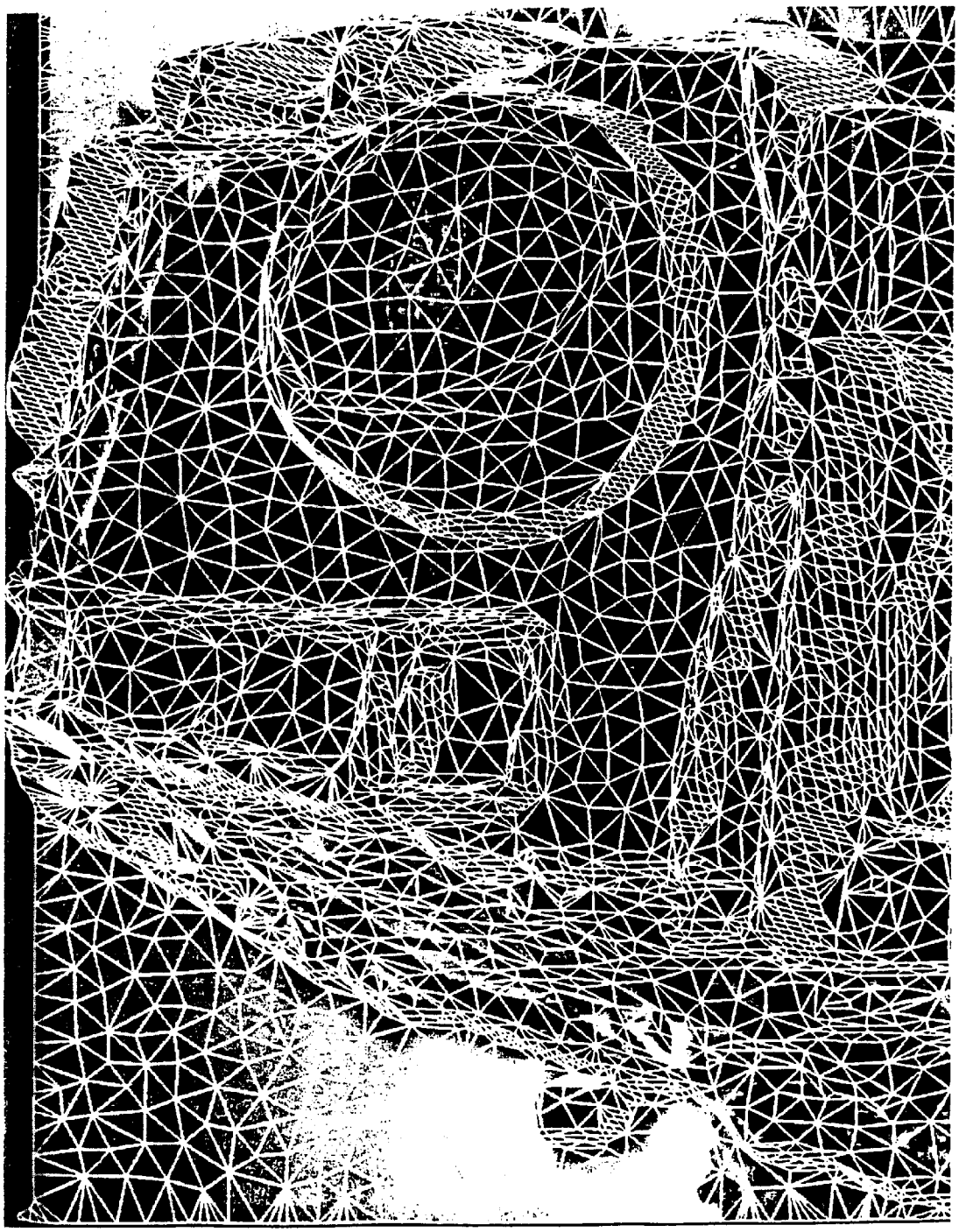
FIG. 7 is an image illustration combining depth meshes with texture mapped video.
Figure 9A:
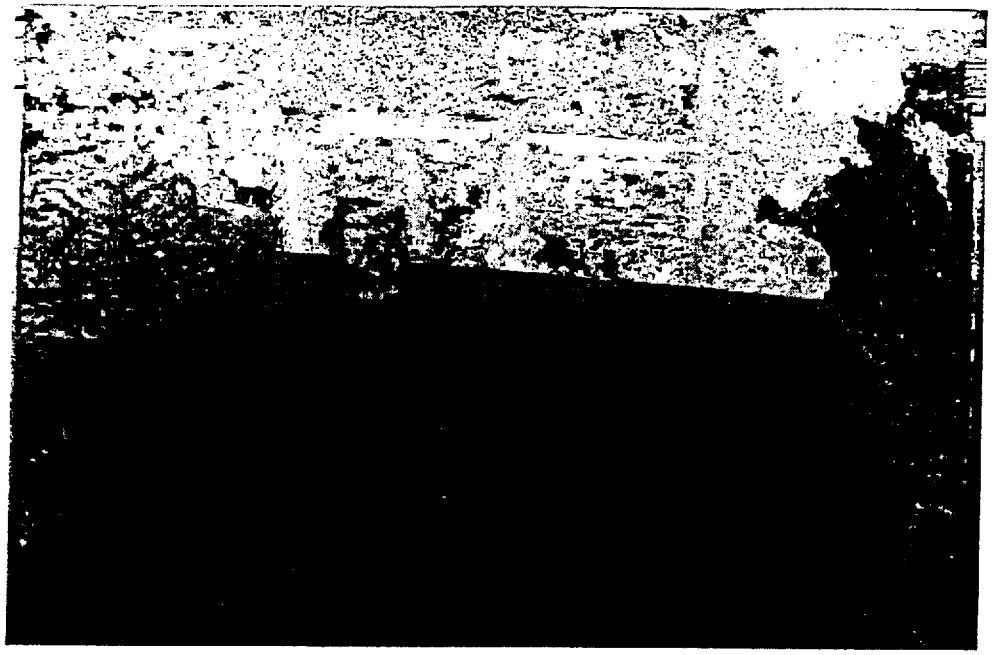
FIG. 9A is a illustration of a depth map as a gray-scale image.

In state 102, a visual representation of this scene is presented to the user such as the view of FIGS. 4 and 4A, including a display of the three dimensional scene structure as provided by the output state 100. This may taken the form of the mesh view shown in FIG. 4A or the global perspective view as in FIG. 4B. However, it should be understood that various other techniques may be used for presenting the depth mesh and/or depth information as well as the visual representation of the scene. For example, a gray scale depth map as presented in FIG. 9A may be presented to the user in which the luminance of each pixel is used as the visual representation of a scaled depth estimate for the corresponding region of the image. In another technique for presenting an integrated view, a false color depth map may be presented whereby the color of each pixel in the visual representation represents the scaled depth estimate. Other possible techniques include the presentation of a geometric surface mesh wherein the shape of the mesh represents estimated surfaces in the visual scene, such as in the display 82 previously described in connection with FIG. 4A. In addition, a visual representation of the image may be presented as a texture map over such a geometric surface mesh, as presented in FIG. 7.

In a next state 104, a display of parametric values 89 is presented to the user as illustrated in FIG. 4B. The parametric values 89 displayed provide the user with current values used in or resulting from the most recent pass of the analysis algorithms 42.

Figure 8A:
FIG. 8A is an original image.
Figure 8B:
FIG. 8B is a mark-up of the image in FIG. 8A illustrating a plane in the image (the large black area on the table).
Figure 8C:
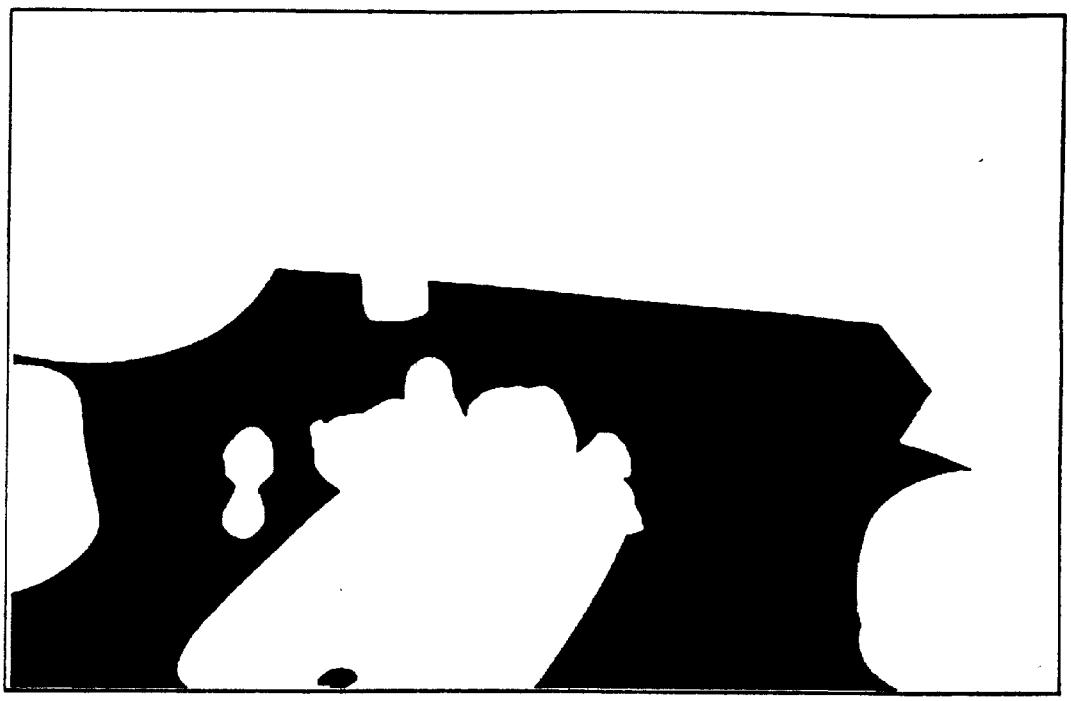
FIG. 8C is the image mask from the table described in FIG. 8B.
Figure 9B:
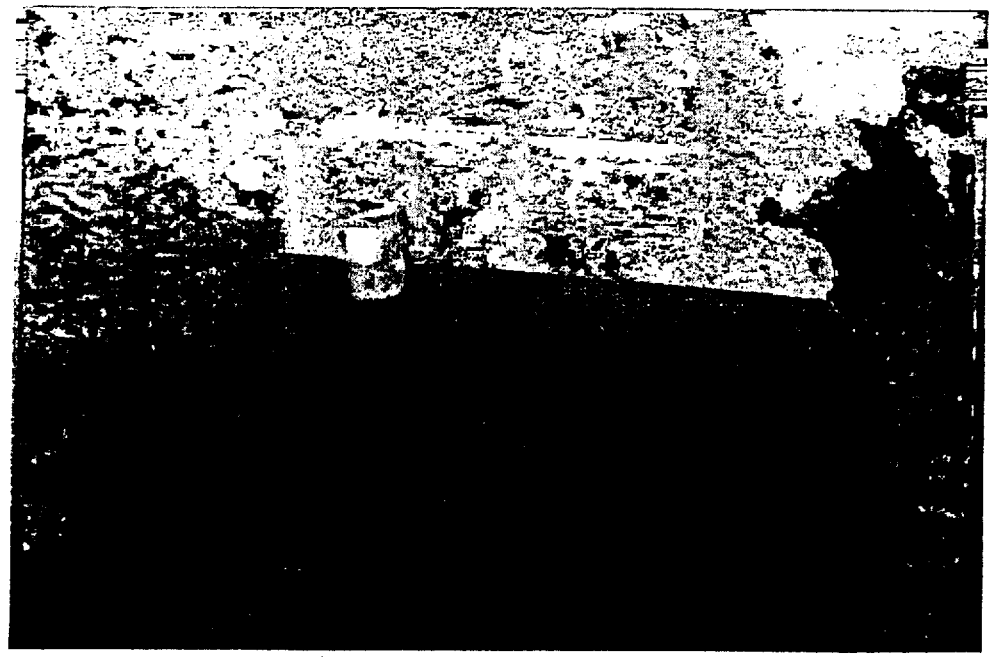
FIG. 9B is an illustration of a depth map including an object (coffee cup) which has its depth hand-painted.

Moving to a state 106, the system 10 then accepts user mark-up of the visual images such as shown in FIG. 8A, (the original image), the FIG. 8B mark-up of a plane in the image, the FIG. 8C resultant image mask, or, as previously described, the outline of the rear window 88 of the vehicle 70, or the hand painted depth map for the coffee mug in FIG. 9B. The system also accepts adjustments to the parametric values previously described in FIG. 4B.

In a next state 108, structure parameters are derived either by user input or by comparing the user input with other aspects of this scene already known or estimated. As an example, the user may specify or stipulate a physical dimension within the scene as illustrated in FIG. 4B point A to point A'. Such a dimension is often referred to as a "ground truth". The user may not know the parameter of focal length, so an estimate, FLE1, is made or derived from analysis algorithm 42 as an estimate 45. Using this parameter (and not the ground truth dimension) the analysis algorithm 42 are executed and a deduced value for A–A' is derived—call this A–A'1. A–A'1 is then compared to the reference ground truth dimension initially specified by the user. Based upon this comparison the user inputs a revised estimate of focal length, FLE2; and the analysis algorithms are executed again using this parameter (and not the initial ground truth dimension).

This iteration results in the deduction of a new value for the distance between A and A' called A–A'2. The system then provides feedback to the user indicating whether FLE1 or FLE2 is the better estimate.

Further, through proportional comparison of A–A'1 minus ground truth dimension and A–A'2 minus ground truth dimension with FLE1 and FLE2 respectively, the system can suggest a new estimate for focal length.

While this example illustrates how the system is capable of providing quantitative system feedback it is only one example. Other techniques may be applied in which the system accepts user inputs of mark-up on one parameter and assess the relative merit of estimates on other parameters, and through such comparisons offers quantitative feedback to the user.

Visual mark-up can also be employed to derive structure parameters in step 108. For example, in connection of the mark-up of the rear window 88, the user may specify a structure parameter telling the system that the outlining region is a plane. The process then iterates returning to state 100 whereby the estimated scene structure is recalculated with the new information provided by the user overriding information derived from the automated scene process.

The user mark-up information further indicates to a scene structure algorithm, such as the algorithm known as the planar parallax method, which regions derive relative position information for a plane. In this case, the algorithm may therefore be expected to provide a depth mesh 82 which shows the window portion 86 of the mesh 82 at a steeper angle more appropriate associated with the actual view angle as is apparent from the visual representation 80.

This user mark-up and attribute information may also be used, for example, as the dominant plane in techniques which used dominant plane information.

Furthermore, knowing that the mark-up region 88 is a plane, a second iteration of the scene structure estimation algorithm in state 100 may then use artifacts "behind" the window 88 such as the object 89 to be ignored in the subsequent iteration of the depth calculation knowing that the window is actually a plane.

Furthermore, the user may not only specify the positional aspects of an object but may also specify their light transmissive properties. For example, the user may indicate to the system that the mark-up area 88 is a transparent surface, thereby further causing the scene structure algorithm to treat any structure which is visible through the mark-up area as data to be ignored. Similar attributes can be assigned to reflective, translucent, or other services having known light transmissive properties.

Knowing that the region 88, is flat the system may force the mesh 82 to be flat in the area. With this piece of information a global parameter such as a camera path which depends upon the mesh can be re-estimated. In turn, the modified camera path information can be fed back into the model 40 to redefine an estimate for local parameters such as the depth of a particular object such as the rack 84.

The user may also associate various attributes with certain other types of objects. For example, it may be known that a particular portion of the window is actually at a 90 degree angle. This area 90 may be indicated by the user to be a 90 degree right angle. This specification of further information about objects being "corners" can be used to remove distortion in the mesh. For example, as is evident from comparing the views 80 and 82 of FIG. 4A, the depth mesh 82 tends to be distorted in a first pass typically because the focal length of the camera 74 is not exactly specified or exact estimates of translations such as the path or orientation of the camera or an estimate of the distance from the camera to the moving vehicle 72 is not exactly known. By specifying areas to be corners which are known right angles, the system 10 can then undo the distortion. This can be performed by normalizing the mesh knowing that item 90 is actually a right angle corner.

In addition, the user mark-up may indicate regions such as 92 to be a motion blur. For example, in this area the tire mounted on the back of the vehicle 72 is blurred in region 92 because the vehicle 72 was moving when the shot was taken. Unfortunately, the automatic scene structure estimation algorithms typically becomes confused with such areas as they provide noise to the process. The system 10 being presented with many uncorrelated data points, typically must also work very hard to resolve the depth of such areas. In the present example, the user may not typically care about the blurred region 92 being more concerned about the aesthetic nature of the hand of the dinosaur 71 properly being shown against the upper portion of the rack 84. In this instance, the user may mark-up the blurred region 92 and specify to the system 10 that this region should be ignored and further depth calculations should not be executed.

The user may also mark-up the depth mesh 82 directly such as by being provided with tools allowing the user to indicate portions of the mesh 92 with the mouse or tablet and drag them around to provide a particular position that appears to be more aesthetically acceptable.

It should be understood that mark-up of a sequence of frames is also possible in a way which sets up the mark-up of a one frame which survives across subsequent frames. This is of particular utility in the present invention, to free the user from the need to mark-up all images such as occur in a motion picture sequence. Similarly, parametric input can survive across subsequent frames.

Figure 6:
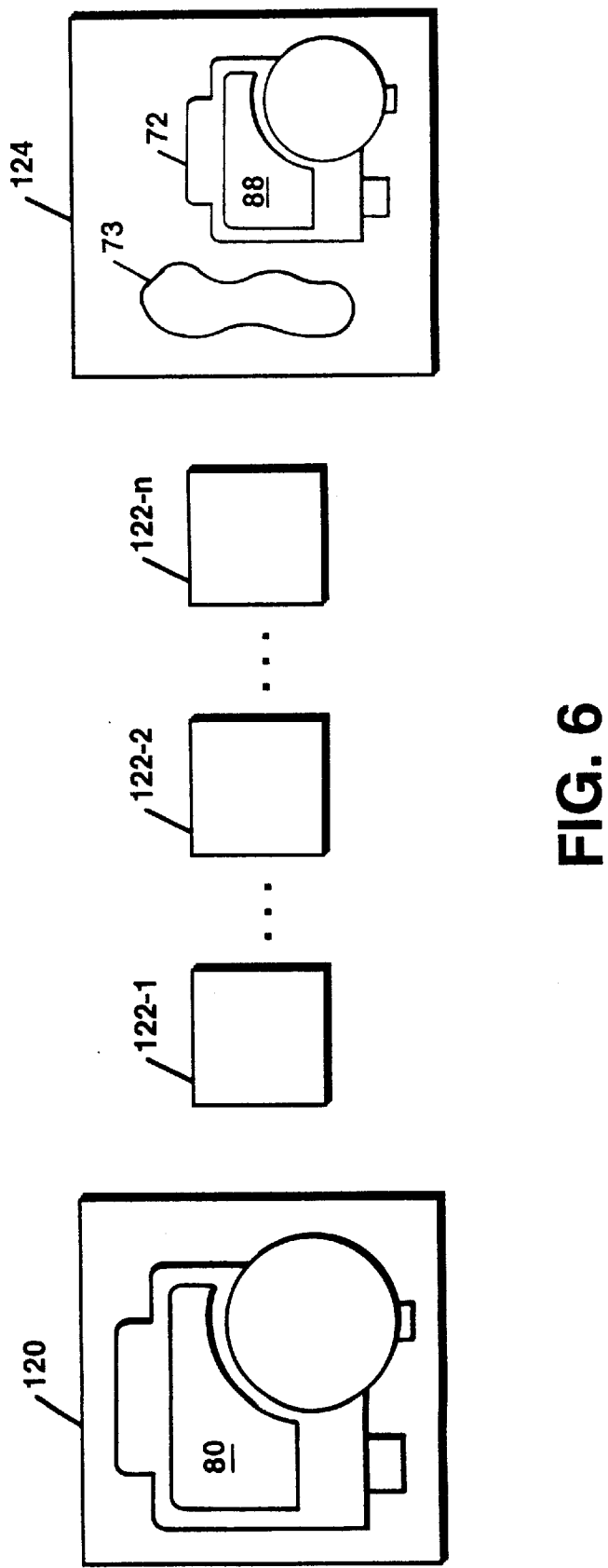

For example, as shown in FIG. 6, in a first frame 120, which is more or less the same as the view shown in FIG. 4A, the user marks up the region 88 as previously described.

However, the vehicle 72 and the camera 74 move in subsequent frames 122-1, 122-2, . . . , 122-n, 124, the mark-up 88 region must therefore be determined in a different manner since the view of the view angle size, and orientation of the vehicle 72 is quite different.

In this instance, there are at least two different techniques for assisting the user mark-up. In a first technique, which is referred to as a key frame technique, the user provides a mark-up of the first image in a sequence through mark-up of a subsequent image 122 in the same sequence. The system 10 then derives a mathematical deformation of the mark-up region 88 from between the two frames 120 and 124, applying the marked up region 88 in the intermediate frames 122.

In another technique for marking up a series of images, an image tracking algorithm may be used to track the marked up region 88. For example, optical flow or feature tracking algorithms such as described in the aforementioned B. K. P. Horn, "Determining Optical Flow" paper can be used to derive the relative motion of objects in the series of images. Having specified the location of the mark-up region 88 and the first image 120, optical flow algorithms may then automatically determine the position of the same region in the subsequent frames 122.

Figure 10:
FIG. 10 is an illustration of a mark-up using Bezier curves to identify a planar surface (table) and specular highlight regions (inside bowl at lower right of frame; top of apple in upper left of frame).

It should be also understood that the user may mark-up a region of the image 80 and identify it as a specular highlight as illustrated in FIG. 10 which depicts the aforementioned planar region and two areas of specular highlights. Such specular highlights may occur where lights, the sun or other bright objects cause an anomaly on the objects which also cause the automatic scene structure algorithm to deviate from proper solution.

Therefore, what has been shown and described is a process for estimating the structure of a visual scene for multiple images of the scene within an interactive user control feedback loop. The feedback loop is between an automated scene structure estimation algorithm and the user mark-up or input on a display that includes visual representations of the images together with the depth estimation results and parametric values. The mark-up can be done on either visual representations of the images, on visual representations of the algorithm results, or both; the input can be provided directly or with assistance of system supplied feed-back.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for revising in a computer-based system a design visualization of a scene structure representing an estimate of a single three-dimensional visual scene derived from multiple two-dimensional images of the scene, the method comprising the steps of:

(a) displaying a visual representation of the estimated three-dimensional scene structure and a visual representation of at least one two-dimensional image used in the estimation algorithm to enable a user to identify features of the three-dimensional scene structure for further modification;

(b) accepting user input that specifies information for the scene estimation algorithm to modify the three-dimensional scene structure;

(c) re-processing some portion of the scene structure estimation algorithm using the user input information to produce a modified three-dimensional scene structure; and (d) iterating selected ones of steps (a) through (c) until user input indicates termination of the iteration based on aesthetic acceptability.

2. A method as in claim 1 wherein the design visualization is for a media production.

3. A method as in claim 1 wherein the design visualization is for an architectural rendering.

4. A method as in claim 1 wherein the design visualization is for an industrial product.

5. A method as in clam 1 wherein the user input is a camera parameter.

6. A method as in claim 1 wherein the user input is a ground truth parameter.

7. A method as in claim 1 in which the images of the visual scene are a time-based sequence of images.

8. A method as in claim 1 in which the images of the visual scene are a time based sequence of stereo image pairs.

9. A method as in claim 1 in which the images of a visual scene are a time-based sequence of multi-baseline stereo images.

10. A method as in claim 1 in which the information supplied in step (b) identifies a specular highlight.

11. A method as in claim 1 in which the information supplied in step (b) identifies one of a translucent, transparent and opaque area.

12. A method as in claim 1 in which the information supplied in step (b) identifies a reflective surface.

13. A method as in claim 1 in which the information supplied in step (b) identifies a shadow.

14. A method as in claim 1 in which the information supplied in step (b) identifies a planar surface.

15. A method as in claim 1 in which the information supplied in step (b) identifies where planar surfaces intersect at a right angle.

16. A method as in claim 1 in which the information supplied in step (b) provides a distance from a fixed point in the original scene.

17. A method as in claim 1 in which the information supplied by the user in step (b) directly modifies the depth information associated with that region.

18. A method as in claim 1 in which the information supplied in step (b) provides the focal length of the camera used to capture the image-frame sequence.

19. A method as in claim 1 in which the information supplied in step (b) identifies a moving object.

20. A method as in claim 1 additionally comprising the step of:

using a motion segmentation algorithm to provide an initial identification of a moving object.

21. A method as in claim 1 in which the information supplied in step (b) identifies an area with motion blur.

22. A method as in claim 1 additionally comprising the steps of:

accepting user input which identifies a region of the scene by specifying a series of points that are then automatically connected by curves.

23. A method as in claim 22 in which the user input is used to control the curvature of each connecting curve.

24. A method as in claim 22 in which the user input identifies the region by specifying a series of points that are automatically connected into a co-planar figure.

25. A method as in claim 24 in which the user input controls the three-dimensional orientation of the co-planar figure with respect to a displayed visual representation of the scene.

26. A method as in claim 24 in which the points defining the co-planar figure are co-planar in the original scene.

27. A method as in claim 1 additionally comprising the step of:

using a feature tracking algorithm to provide an initial identification of a region in an image frame which is based on a region previously identified in another image frame in a given sequence of image frames.

28. A method as in claim 27 wherein the a feature tracking algorithm provides an initial identification of a region across multiple image frames using keyframe interpolation of mark-ups by the user.

29. A method as in claim 1 additionally comprising the step of, before step (c):

presenting the user with a visual representation of scene structure as a three dimensional representation.

30. A method as in claim 29 wherein the visual representation of scene structure is presented as a gray-scale depth map where the luminance of each pixel in the visual representation represents a scaled depth estimate for the corresponding region of an image from the visual scene.

31. A method as in claim 29 in which the visual representation of scene structure is presented as a false-color depth map where the color of each pixel in the visual representation represents a scaled depth estimate for the corresponding region of an image from the visual scene.

32. A method as in claim 29 in which the visual representation of scene structure is presented as a geometric surface mesh where the shape of the mesh represents estimated surfaces in the visual scene.

33. A method as in claim 32 in which the visual representation of scene structure is presented as a texture mapped image frame onto the geometric surface mesh.

34. A method as in claim 29 in which the visual representation of scene structure includes indications of areas where the estimation algorithm had insufficient data to generate an estimated scene structure based on a confidence measure and a threshold value for the confidence measure.

35. A method as in claim 34 additionally comprising the step of accepting user input to modify the threshold value.

36. A method as in claim 1 in which the images are captures from a scene in the physical world using a film camera.

37. A method as in claim 1 in which the images are captures from a scene in the physical world using a video camera.

38. A method as in claim 1 in which the visual representation is rendered from a synthetic scene represented as an abstract computer-based model.

39. A method as in claim 1 in which at least a part of the estimation algorithm is processed on a specialized hardware accelerator.

40. A method as in claim 1 wherein the user input defines a camera path.

41. A method as in claim 1 wherein step (b) additionally includes echoing mark-up in a first visual representation of the scene on a different second visual representation of the scene.

42. A method as in claim 1 wherein user input includes mark-up information for use in a downstream rendering/compositing process.

43. A method as in claim 1 additionally comprising the step of, after step (b), providing feedback to the use as to whether user input changes improve or degrade results.

44. A method as in claim 1 additionally comprising the step of, after step (a), presenting capture parameters to the user.

45. A method as in claim 1 additionally comprising the step of, after step (b), enabling the user to adjust capture parameters in concert with mark-up iterations.

46. A method as in claim 1 additionally comprising the step of, after step (b), presenting the user with a revised visual representation of the scene structure.

47. A method as in claim 46 additionally comprising the steps of:

assessing the relative merit of applying the user input as a parameter in the scene estimation process, and;

presenting quantitative feedback as to how the parameter should be changed to improve the estimation.

48. A method as in claim 47 wherein the scene includes an object having at least one ground truth straight distance, the assessed parameter includes a camera focal length parameter, and the qualitative feedback presents the user with an estimate of a needed change in the focal length parameter needed so that the scene estimation processing will converge.

49. A method as in claim 48 in which the estimate of the needed change in the focal length parameter indicates the sign of the needed change.

* * * * *